US009852637B2

(12) United States Patent
Hayee et al.

(10) Patent No.: US 9,852,637 B2
(45) Date of Patent: Dec. 26, 2017

(54) VEHICLE-TO-VEHICLE CONGESTION MONITORING USING AD HOC CONTROL (71) Applicant: Regents of the University of Minnesota, Minneapolis, MN (US)

(72) Inventors: M. Imran Hayee, Duluth, MN (US); Umair Ibrahim, Riverside, CA (US)

(73) Assignee: Regents of the University of Minnesota, Minneapolis, MN (US)

( * ) Notice: Subject to any disclaimer, the term of this patent is extended or adjusted under 35 U.S.C. 154(b) by 137 days.

(21) Appl. No.: 14/593,172

(22) Filed: Jan. 9, 2015

(65) Prior Publication Data

US 2015/0199905 A1    Jul. 16, 2015

Related U.S. Application Data (60) Provisional application No. 61/926,020, filed on Jan. 10, 2014.

(51) Int. Cl.
G08G 1/00        (2006.01)
G08G 1/0967      (2006.01)
G08G 1/16        (2006.01)
B60W 40/04       (2006.01)

(52) U.S. Cl.
CPC ........ G08G 1/22 (2013.01); G08G 1/096716 (2013.01); G08G 1/096758 (2013.01); G08G 1/096791 (2013.01); G08G 1/162 (2013.01); B60W 40/04 (2013.01); B60W 2550/408 (2013.01)

(58) Field of Classification Search
None
See application file for complete search history.

(56) References Cited

U.S. PATENT DOCUMENTS

| 4,727,371 A | 2/1988 | Wulkowicz |
| 8,520,695 B1 | 8/2013 | Rubin et al. |
| 2002/0008637 A1 | 1/2002 | Lemelson et al. |

(Continued)

FOREIGN PATENT DOCUMENTS

| CA | 2794990 A1 | 6/2013 |
| CN | 102625239 A | 8/2012 |

OTHER PUBLICATIONS

Maitipe et al., Development and Field Demonstration of DSRC Based V2V-Assisted V2I Traffic Information System for the Work Zone, Jun. 2012, Intelligent Transportation Systems Institute Center for Transportation Studies University of Minnesota.*

(Continued)

Primary Examiner — Rami Khatib
Assistant Examiner — Gerrad A Foster
(74) Attorney, Agent, or Firm — Theodore M. Magee; Westman, Champlin & Koehler, P.A.

(57) ABSTRACT

A vehicle-to-vehicle communication unit includes a vehicle communication transceiver that transmits and receives messages to and from other vehicles. The messages include at least one safety message from another vehicle that indicates that the other vehicle has decreased its velocity. The vehicle-vehicle communication unit also includes a processor that based on the safety message generates a message for other vehicles indicating that the vehicle-to-vehicle communication unit has designated itself as an ad hoc host for determining information about a congested area on a roadway.

30 Claims, 8 Drawing Sheets (56) References Cited

U.S. PATENT DOCUMENTS

| | | |
|---|---|---|
| 2004/0075582 A1 | 4/2004 | Bergan |
| 2005/0267671 A1 | 12/2005 | Matsumoto |
| 2007/0010934 A1 | 1/2007 | Breitenberger |
| 2007/0194950 A1 | 8/2007 | Boss |
| 2008/0218379 A1 | 9/2008 | Boss |
| 2009/0234859 A1 | 9/2009 | Grigsby et al. |
| 2010/0188265 A1 | 7/2010 | Hill et al. |
| 2011/0199231 A1 | 8/2011 | Loiselle et al. |
| 2012/0083995 A1 | 4/2012 | Vorona |
| 2013/0018705 A1 | 1/2013 | Heath |
| 2013/0293422 A1 | 11/2013 | Guner |
| 2015/0126222 A1 | 5/2015 | Ignatin |
| 2015/0183440 A1 | 7/2015 | Jackson |
| 2015/0199902 A1 | 7/2015 | Hayee et al. |
| 2016/0133131 A1 | 5/2016 | Grimm et al. |
| 2017/0127237 A1 | 5/2017 | Hayee et al. |

OTHER PUBLICATIONS http://www.caltrans.ca.gov/newtech/researchreports/reports/2009/portable_atis_con_ops_final_report.pdf.
http://trb.metapress.com/content/4885780436228757/.
http://trid.trb.org/view.aspx?id=1247059.
http://trid.trb.org/view.aspx?id=1241344.
http://www.cts.umn.edu/Publications/ResearchReports/reportdetail.html?id=2148.
http://www.cts.umn.edu/Publications/ResearchReports/reportdetail.html?id=2250.
ADDCO company website; model DLH1000-ALS. Date accessed: Jan. 2012. http://www.addco.com/en/products/traffic/portables/als/.
DSRC Committee of the Society of Automotive Engineers (SAE), "Dedicated short range message set (DSRC) dictionary," SAE, Warrendale, PA, Tech. Rep. Std. J2735, 2009.
Intelligent Transportation Systems in Work Zones: A Cross-Cutting Study. Integrated Work Zone Systems for Improving Travel Conditions and Safety. No. FHWA-OP-02-025. FHWA, Washington, D.C., 2002.
Intelligent Transportation Systems in Work Zones: A Case Study (Dynamic Lane Merge System). Report No. FHWA-HOP-04-033. U.S. Department of Transportation, Washington, DC 2004.
Manual on Uniform traffic control devices. Federal Highway Administration, U.S. Department of Transportation, Washington D.C., pp. 2A-2 to 2A-3 and 6F-25 and 6F-26, 2003.
Real-Time Work Zone Traffic Control System—Using an Automated Traffic Information System to Reduce Congestion and Improve Safety During Reconstruction of the I-55 Lake Springfield Bridge in Illinois Intelligent Transportation Systems in Work Zones: A Case Study, FHWA-HOP-04-018, 2004.
Research and Innovative Technology Administration ITS Research fact sheets. http://www.its.dot.gov/factsheets/dsrc_factsheet.htm . Accessed Aug. 1, 2011.
Abdel-Aty, M. et al. Comprehensive Analysis of Relationship between Real-Time Traffic Surveillance Data and Rear-End Crashes on Freeways. In Transportation Research Record: Journal of the Transportation Research Board, No. 1953, Transportation Research Board of the National Academies, Washington, D. C., 2006, pp. 31-40.
Alazawi, Z. et al.: Intelligent disaster management system based on cloud-enabled vehicular networks. In Proc. of 11th International Conference on ITS Telecommunications (ITST), Aug. 23-25, pp. 361-368, 2011.
Bai, F. et al. Reliability Analysis of DSRC Wireless Communication for Vehicle Safety. Intelligent Transportation Systems Conference, 2006. IEEE, pp. 355-362.
Büscher, M. et al. Intelligent mobility 1 systems: some sociotechnical challenges and opportunities, in communications Infrastructure: Systems and Applications in Europe, R. Mehmood, E. Cerqueira, R. Piesiewicz, and I. Chlamtac, Eds., pp. 140-152, 2009.

Bushman, R. et al.. Effect of Intelligent Transportation Systems in Work Zones: Evaluation of North Carolina Smart Work Zones. North Carolina Department of Transportation, NC. 2004.
Calabrese, F. et al. Real-Time Urban 22 Monitoring Using Cell Phones: A Case Study in Rome. IEEE Transactions on Intelligent Transportation Systems, vol. 12, No. 1, 2011, pp. 141-151.
Cheng, L., A fully mobile, GPS enabled, vehicle-to-vehicle measurement platform for characterization of the 5.9 GHz DSRC channel, Antennas and Propagation Society International Symposium, 2007, IEEE.
Cheng, L., A Roadside Scattering Model for the Vehicle-to-Vehicle Communication Channel, IEEE Journal on Selected Areas in Communication, 2013.
Chu, L et al. Evaluation of effectiveness of automated work zone information systems. In Transportation Research Record: Journal of Transportation Research Board, No. 1911, Transportation Research Board of the National Academies, Washington, D.C., 2005, pp. 73-81, Dec. 2009.
Coifman, B. et al. Vehicle Reidentification and Travel 1 Time Measurement on Congested Freeways. Transportation Research Part A: Policy and Practice, vol. 36, No. 10, 2002, 50 pp. 899-917.
Cowan, R.J. Useful headway models. Transportation Research, vol. 9, Issue 6, Dec. 1975.
Fang, C. Portable Intelligent Traffic Management System for Work Zones and Incident Management Systems: Best Practice Review. In proceedings of 11th International IEEE Conference on Intelligent Transportation Systems, ITSC 2008., pp. 563-568, Oct. 12-15, 2008.
Fambro, B. D. et al. Transportation research circular E-0003: A new stopping sight distance model for use in highway geometric design. In Transportation Research Board of the National Academies, Washington, DC, 1998.
Faouzi, N. et al. Motorway Travel Time Prediction Based on Toll Data and Weather Effect Integration. IET Intelligent Transport Systems, vol. 4, No. 4, 2010, pp. 338-345.
Farah, H. et al. Evaluation of the effect of cooperative infrastructure-to-vehicle systems on driver behavior, Transportation Research Part C: Emerging Technologies, vol. 21, Issue 1, Apr. 2012, pp. 42-31 56.
Fontaine, M.D. Guidelines for Application of Portable Work Zone Intelligent Transportation Systems. In Transportation Research Record: Journal of Transportation Research Board, No. 1824, Transportation Research Board of the National Academies, Washington, D.C., 2003, pp. 15-22, Mar. 2010.
Gartner, N. et al. Revised Monograph on Traffic Flow Theory, (8) Unsignalized Intersections. In Transportation Research Record: Journal of Transportation Research Board, Transportation Research Board of the National Academies, Washington, D.C., 2005.
Gates, T. J. et al. Analysis of Driver Behavior in Dilemma Zones at Signalized Intersections. In Transportation Research Record: Journal of the Transportation Research Board, No. 2030, Transportation Research Board of the National Academies, Washington D.C., 2007, pp. 29-39.
Haseman, R. J. et al. Real-Time Measurement of Travel Time Delay in Work Zones and Evaluation Metrics Using Bluetooth Probe Tracking. In Transportation Research Record: Journal of the Transportation Research Board, No. 2169, Transportation Research Board of the National Academies, Washington, D.C., 2010, pp. 40-53.
Hassan, Y. et al. Effect of vertical alignment on driver perception of horizontal curves. In Journal of Transportation Engineering 129.4 (2003): 399-407.
Herrera, J. C. et al. Evaluation of Traffic Data Obtained via GPS-enabled Mobile Phones: The Mobile Century Field Experiment. Transportation Research Part C: Emerging Technologies, vol. 18, No. 4, 2010, pp. 568-583.
Hsu, C. et al. Verification of On-Line Vehicle Collision Avoidance Warning System using DSRC. World Academy of Science, Engineering and Technology, issue 55, Jul. 2009.
Huang, L. et al. Adaptive inter-vehicle communication control for cooperative safety systems. IEEE Network, vol. 24, No. 1, pp. 6-13, Jan. 2010.

(56) References Cited

OTHER PUBLICATIONS

Ibrahim, U. et al. Hybrid DSRC-PCMS Traffic Information System for Work Zone—Development and Field Demonstration. In Transportation Research Board's 92nd Annual Meeting, Jan. 13-17, Washington, D.C. 2013.
Jiang, D. et al. Design of 5.9 GHz DSRC-based Vehicular Safety Communication. IEEE Wireless Communications magazine, vol. 13 No. 5, pp. 36-43, Oct. 2006.
Kandarpa, A.R. et al. Final Report: Vehicle Infrastructure Integration Proof of Concept (POC) Test—Executive Summary. Booz Allen Hamilton, McLean, VA. Feb. 2009.
Kwong, K et al. Arterial Travel Time Estimation Based on Vehicle Re-identification Using Wireless Magnetic Sensors. Transportation Research Part C: Emerging Technologies, vol. 17, No. 6, 2009, pp. 586-606.
Lajunen, T, et al. Does traffic congestion increase driver aggression? In Transportation Research Part F: Traffic sychology and Behavior, vol. 2, Issue 4, pp. 225-236, Dec. 1999.
Layton, R. et al. Stopping Sight Distance, Kiewit Center for Infrastructure and Transportation, Oregon Department of Transportation, Apr. 2012.
Lee, E. et al. Automated Work Zone Information System (AWIS) on Urban Freeway Rehabilitation: California Implementation. In Transportation Research Board (TRB) 85th Annual Meeting, Washington, D.C., 2005.
Liu, Y. et al. Performance evaluation of intersection warning system using a vehicle traffic and wireless simulator. In Proceedings of IEEE Intelligent Vehicles Symposium, vol., No., pp. 171-176, Jun. 6-8, 2005.
Luttrell, T et al. Comparative Analysis Report: The Benefits of Using Intelligent Transportation Systems in Work Zones. FHWA-HOP-09-002.Washington, DC 2008: Federal Highway Administration.
Maitipe, B.R. et al. Development and Field 1 Demonstration of DSRC-Based V2I Traffic Information System for the Work Zone. In Transportation Research Record: Journal of Transportation Research Board, Transportation Research Board of the National Academies, Washington, D.C., 2011.
Maitipe, B.R. et al. Development and Field Demonstration of DSRC-Based V2I Work Zone Traffic Information System with V2V assistance. In Transportation Research Board's 91th Annual Meeting, Jan. 23-27, Washington, D.C. 2012.
Marfia, G et al. Vehicular congestion modeling and estimation for advanced traveler information systems. In proceedings of the International Federation for Information Processing Wireless Days WD-IFIP, Oct. 2010, pp. 1-5, 20-22.
Misener, J.A. et al. PATH Investigations in Vehicle-Roadside Cooperation and Safety: A Foundation for Safety and Vehicle-Infrastructure Integration Research. In proceedings of Intelligent Transportation Systems Conference (ITSC)'06. IEEE, 9-16. 2006.
Morgan, Y.L, Managing DSRC and WAVE standards Operations in a V2V Scenario, International of Vehicular Technology, 2010.
Nowakowski, C. et al. Evaluation of Real-Time Freeway End-of-Queue Alerting System to Promote Driver Situational Awareness. In Transportation Research Record: Journal of Transportation Research Board, No. 2324, Transportation Research Board of the National Academies, Washington, D.C., 2012, pp. 37-43, Mar. 2013.
Nowakowski, C. et al. A SafeTrip 21 Initiative: Networked Traveler Foresighted Driving Field Experiment Final Report. Technical Report UCB-ITS-PRR-2011-05. California Partners for Advanced Transit and Highways, University of California, Berkeley, 2010.
Pesti, G. et al. (2013). Simulation Based Evaluation of Dynamic Queue Warning System Performance. In Transportation Research Board 92nd Annual Meeting. No. 13-5086, Washington D.C. 2012.
Pollack, M. et al. Narrative text analysis to identify technologies to prevent motor vehicle crashes: Examples from military vehicles, Journal of Safety Research, No. 44, Feb. 2013, pp. 45-49.
Qian, Y. A Secure VANET Mac Protocol for DSRC Applications. In Proceedings of IEEE Globecom, 2008, New Orleans, Nov. 2008.
Shimura, A. et al. M. QoS Management Technique of Urgent Information 8 Provision in ITS Services using DSRC for Autonomous based Stations. IEICE Transactions on Information and Systems, Sep. 2008, vol. E91D, Issue: 9, pp. 2276-2284.
Ullman, G. L. et al. Development of a Field Guide for Portable Changeable Message Sign Use in Work Zones. Texas Transportation Institute, College Station, 2005.
van Eenennaam, E.M. et al.. Providing over-the-horizon awareness to driver support systems. In Proceedings of 4th IEEE Workshop on Vehicle to Vehicle Communications (V2VCOM), pp. 19-25, 2008.
Varaiya, P. What We've Learned About Highway Congestion. Access, vol. 27, 2005, pp. 2-9.
Wegener, A. TraCI: an interface for coupling road traffic and network simulators. In Proceedings of the 11th communications and networking simulation symposium (CNS '08). ACM, New York, NY, USA, 2008, 155-163.
Weng. J. et al. Rear-end crash potential estimation in the work zone merging areas. In Journal of Advanced Transportation, SN: 2042-3195, 2012.
Xiao, J. et al. Traffic incident detection using multiple-kernel support vector machines. In 3 Transportation Research Record: Journal of Transportation Research Board, No. 2324, Transportation Research Board of the National Academies, Washington, D.C., 2012, pp. 44-52, Mar. 2013.
Xu, Q. et al. Vehicle-to Vehicle Safety Messaging in DSRC. In Proceedings of 1st ACM Workshop on Vehicular Adhoc Networks (VANET), Oct. 2004.
Zhoe, H. et al. Vehicle platoon control in High-latency wireless communications environment: Model predictive control method. In Transportation Research Record: Journal of Transportation Research Board, No. 2324, Transportation Research Board of the National Academies, Washington, D.C., 2012, pp. 81-90, Mar. 2013.
Final Office Action dated May 1, 2017 for U.S. Appl. No. 14/593,179.
Prosecution history from corresponding U.S. Appl. No. 14/593,179 including: Office Action dated Oct. 13, 2016 and Amendment dated Jan. 4, 2017.
Bowman, An Innovative Intelligent Awareness System for Roadway Workers Using Dedicated Short-Range Communications, Report prepared for the Research and Innovative Technology Administration (RITA), U.S. Department of Transportation, submitted by Virginia Tech Transportation Institute, Blacksburg, VA, 21 pages, Jan. 31, 2015.
Farrell et al., Differential GPS Reference Station Algorithm-design and Analysis, IEEE Transactions on Control Systems Technology, vol. 8, No. 3, May 2000, pp. 519-531.
Geronimo et al., Survey of Pedestrian Detection for Advanced Driver Assistance Systems, IEEE Transactions on Pattern Analysis and Machine Intelligence, vol. 32, No. 7, 2010, pp. 1239-1258.
Gressmann et al., Surround view pedestrian detection using heterogeneous classifier cascades, 14th International IEEE Conference on Intelligent Transportation Systems, Oct. 5-7, 2011.
Ibrahim, Development of a freeway queue detection and warning system using Ad-hoc control and DSRC based V2V Communication, Bentham Science Publishers, 2014, pp. 1-10.
Karsky, Comparing Four Methods of Correcting GPS Data: DGPS, WAAS, L-Band, and Post-processing, Report, Tech Tip 0471-2307-MTDC, U.S. Department of Agriculture, Forest Service, Missoula Technology and Development Center. Missoula, MT, 6 pages, Jul. 2004.
Kashif, Wireless Communication Technologies for ITS Applications, Topics in Automotive Networking, Communications Magazine, IEEE 48, No. 5, 2010, pp. 156-162.
Maitipe et al., Vehicle-to-Infastructure Traffic Information System for the Work Zone Based on Dedicated Short-Range Communication, Transportation Research Record, Journal of Transportation Research Board, No. 2243, pp. 67-73, 2011.
Maitipe et al., Vehicle-to-Infrastructure and Vehicle-to-Vehicle Information Systems in Work Zones, Transportation Research Record: Journal of the Transportation Research Board, No. 2324, Transportation Research Board of the National Academies, Washington, D.C., pp. 125-132, 2012.

(56) References Cited

OTHER PUBLICATIONS

Maitipe et al., Development and Field Demonstration of DSRC: Based V2V-Assisted V2I Traffic Information System for the Work Zone, Jun. 2012, Intelligent Transportation Systems Institute Center for Transportation Studies University of Minnesota, 50 pages.

Maitipe et al., Development and Field Demonstration of DSRC-based V2I Work Zone Traffic Information System with V2V Assistance, Transportation Research Board's 91th Annual Meeting, Jan. 23-27, Washington, D.C. 2012, 14 pages.

Matosevic et al., Comparison of Accuracy using GPS and low-cost DGPS, IEEE Transactions on Instrumentation and Measurement, vol. 55, No. 5, Oct. 2006, pp. 1677-1683.

Minnesota Department of Transportation. Internet. Speed Limits in Work Zones Guidelines, Oct. 2014.(Accessed Jul. 11, 2015), http://www.dot.state.mn.us/speed/pdf/WZSpeedLimitGuideline.pdf, 25 pages.

Minnesota Department of Transportation. Internet. 2012 CMS Manual of Practice. Oct. 2012. (Accessed Jul. 11, 2015), http://dotapp7.dot.state.mn.us/edms/download?docId=1244587, 66 pages.

National Work Zone Safety, Information Clearinghouse, Internet, Guidelines on Managing Speeds in Work Zones, Roadway Safety Consortium (Access Jul. 2015), http://www.workzonesafety.org/files/documents/training/courses_programs/rsa_program/RSP Guidance Documents Download/RSP Speed Guidance Download.pdf, 12 pages.

OKI's GPS receiver with DSRC technology: http://oki.com/en/press/2009/01/z08113e.html, 2016, 1 page.

Rahman et al., Smartphone-based Forward Collision Warning Messages in Work Zones to Enhance Safety and Reduce Emissions. Presented at 94th Transportation Research Board Annual Meeting, Washington, D.C., Jan. 11-15, 2015, 20 pages.

Saleem, Analysis and Mitigation of Tropospheric Error Effect on GPS Positioning Using Real GPS Data, International Journal of Electronics and Electrical Engineering, vol. 2, No. 3, Sep. 2014, pp. 249-253.

Sebastien, Empirical IEEE 802.11 p Performance Evaluation on Test Tracks, Journal of Networks 9, No. 6, 2014, pp. 1485-1495.

U.S. Department of Transportation, Federal Highway Administration. Internet. High Accuracy-Nationwide Differential Global Positioning System Program Fact Sheet. FHWARD-03-39, 2003(Accessed Jul. 10, 2015), http://www.fhwa.dot.gov/publications/research/operations/03039/, 1 page.

U.S. Department of Transportation, National Highway Traffic Safety Administration. Internet. Vehicle Safety Communications—Applications (VSC-A), Final Report (Accessed Jun. 2016), http://www.nhtsa.gov/DOT/NHTSA/NVS/Crash%20Avoidance/Technical%20Publications/2011/811492A.pdf, 2011, 102 pages.

U.S. Department of Transportation, Intelligent Transportation Systems Joint Program Office. Internet. DSRC Communications Scalability Research Update, ITS-JPO Public Workshop Sep. 24, 2013 (Accessed Jun. 2016), http://www.its.dot.gov/presentations/CV_PublicMeeting2013/PDF/Day1_LukucInteroperability.pdf, 17 pages.

Worker Safety Data on US DoT website: http://www.ops.fhwa.dot.gov/wz/workersafety/, 2016, 2 pages.

Jia, C. et al. (2013). Evaluation of Alternative Technologies to Estimate Travel Time on Rural Interstates. In Transportation Research Board 92nd Annual Meeting. No. 13-3892, Washington D.C. 2013.

* cited by examiner

001# VEHICLE-TO-VEHICLE CONGESTION MONITORING USING AD HOC CONTROL

CROSS-REFERENCE TO RELATED APPLICATION

The present application is based on and claims the benefit of U.S. provisional patent application Ser. No. 61/926,020, filed Jan. 10, 2014, the content of which is hereby incorporated by reference in its entirety.

BACKGROUND

Due to growing traffic demands and frequent lane closures, long traffic queues and delays are very common. As result of lane closures due to work zone or traffic incidents, queues can build quickly and often grow past advanced static warning signs, especially during rush hour traffic. In such situations, many drivers catch the back of the queue by surprise increasing the probability of rear end collisions. An important measure to counter such rear-end collisions is to provide advanced safety messages to the drivers of the vehicles that are approaching the back of the queue. A number of research studies and field experiments have estimated that an advanced warning can help prevent rear-end collisions by 20-90%. In addition to avoiding rear-end collisions, advanced warning messages can guide drivers approaching the end of the queue to take an alternative route, which in turn helps lower the congestion and thereby improve traffic mobility.

Many traffic information systems are being developed using a variety of wireless technologies e.g., cellular, Bluetooth, and radio frequency identification, to estimate traffic parameters and warn drivers in a timely manner. However, all these traffic information systems require special roadside infrastructure support and depend on a third party cellular infrastructure to acquire, process and disseminate traffic data. Furthermore, such systems gather traffic data only where infrastructure support is available and usually these traffic data updates are quite infrequent.

SUMMARY

A vehicle-to-vehicle communication unit includes a vehicle communication transceiver that transmits and receives messages to and from other vehicles. The messages include at least one safety message from another vehicle that indicates that the other vehicle has decreased its velocity. The vehicle-vehicle communication unit also includes a processor that based on the safety message generates a message for other vehicles indicating that the vehicle-to-vehicle communication unit has designated itself as an ad hoc host for determining information about a congested area on a roadway.

In a further embodiment, a vehicle includes a position system that determines positions of the vehicle and a speed system that determines speeds of the vehicle. A processor in the vehicle determines a position of a start of congestion from speeds provided by the speed system and a position provided by the position system, and determines a position of an end of congestion from speeds provided by the speed system and a position provided by the position system. A communication system in the vehicle communicates directly to at least one other vehicle to provide the position of the start of congestion and the position of the end of congestion.

A system of vehicles includes a decelerating vehicle entering a congestion area and issuing a vehicle-to-vehicle message indicating the position of the vehicle and that the vehicle is decelerating. A free-flow vehicle that has yet to reach the congestion area, receives the vehicle-to-vehicle message and based on the message evaluates whether the free-flow vehicle is a candidate for evaluating the congestion and when the free flow vehicle is a candidate for evaluating the congestion, the free flow vehicle issuing a vehicle-to-vehicle message indicating that the free-flow vehicle will be evaluating the congestion and thereby become a host vehicle.

DETAILED DESCRIPTION

Embodiments describe below provide a traffic information system that acquires and disseminates traffic data in real time using dedicated short range communication (DSRC) based vehicle-to-vehicle (V2V) communication without needing any roadside infrastructure support. The embodiments detect congestion buildup on a given road, select a vehicle that has not reached the congestion to act as an ad hoc host and use the ad hoc host to periodically transmit V2V messages that include previously determined parameters for the congestion such as travel time (TT), starting location of congestion (SLoC), and ending location of congestion (ELoC). These messages are used within the receiving vehicles to provide useful traffic alerts in real time to improve drivers' situational awareness. In addition, the ad hoc host determines new values for TT, SLoC, and ELoC and sends V2V messages containing these new values along with an indication that the ad hoc host will be abandoning its ad hoc host duties. A new ad hoc host is then selected.

One advantage of the present system is that it does not depend on any DSRC roadside central control. Instead, a DSRC equipped vehicle present on the road can be chosen as an ad hoc central control which can accomplish the task of acquisition and dissemination of traffic parameters using only V2V communication.

Figure 1:
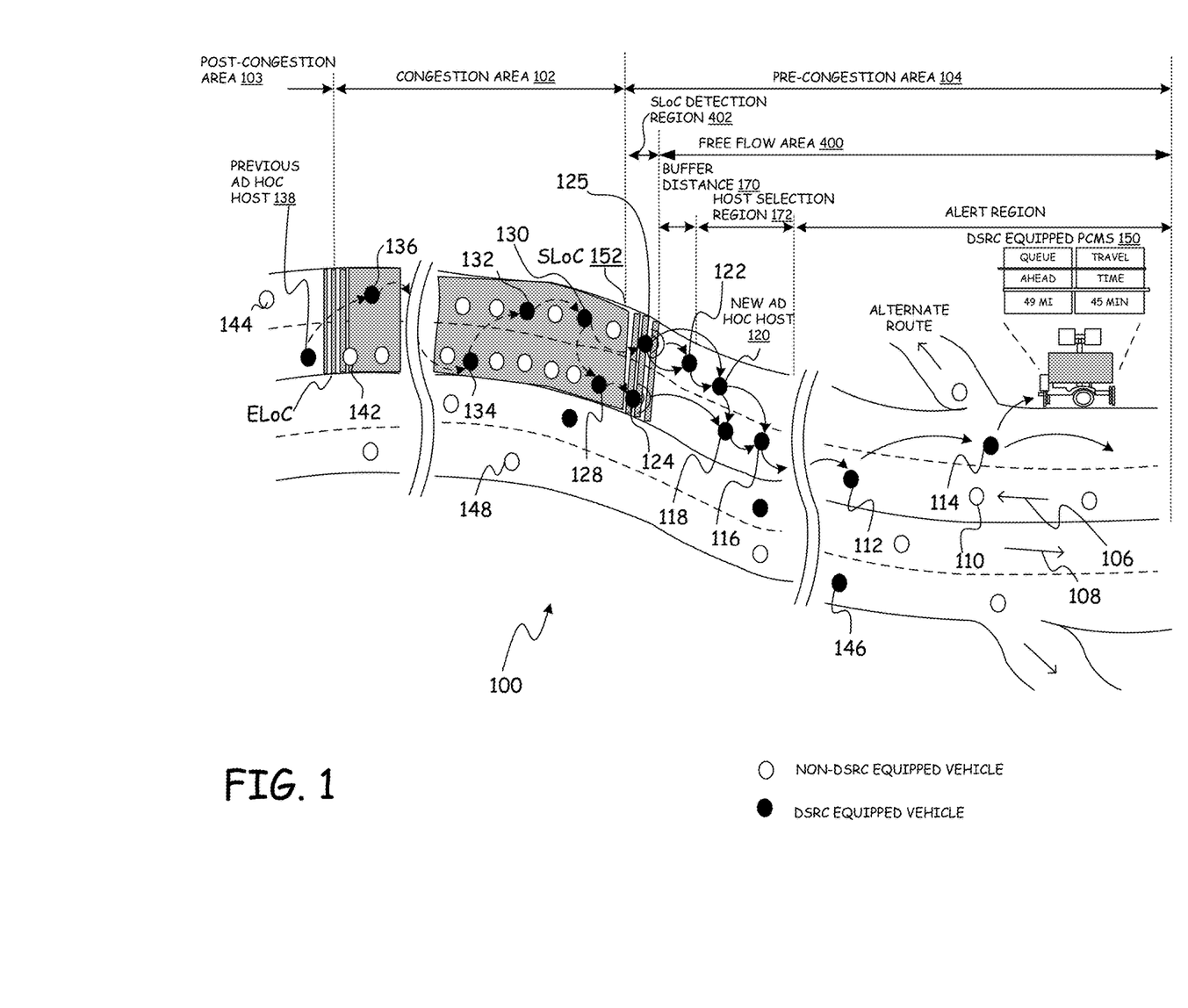
FIG. 1 is a plan view of a traffic environment in which various embodiments are practiced.

FIG. 1 provides a plan view of an example traffic environment 100 in which the various embodiments are practiced. Traffic environment 100 includes congestion area 102, post-congestion area 103 and pre-congestion area 104. Pre-congestion area 104 becomes congestion area 102 at the Starting Location of Congestion (SLoC) 152. Congestion area 102 becomes post-congestion area 103 at Ending Location of Congestion (ELoC) 153. Within traffic environment 100, a collection of vehicles are present with some of the vehicles, such as vehicles 112, 120, 134, and 138, for example, moving in general direction 106 such that the vehicles pass from pre-congestion area 104, through congestion area 102, and finally to post-congestion area 103. Other vehicles, such as vehicles 146 and 148 are moving in an opposite general direction 108 in opposing lanes of traffic and will not enter congestion area 102.

Pre-congestion area 104 is divided into a free-flow area 400 and a SLoC detection area 402. In free-flow area 400 and in post-congestion area 103, the vehicles travel at a free-flow speed. In SLoC detection area 402, the drivers have detected the start of congestion and have begun braking thereby causing the vehicles to decelerate. Due to this deceleration, traffic moves at a slower congested speed within congestion area 102.

Free-flow area 400 is further divided into a buffer distance 170, a host selection region 172 and an alert region 174. Vehicles such as vehicles 112 and 114 in alert region 174 receive vehicle-to-vehicle messages containing the SLoC, the ELoC and the transit time (TT) for passing through congestion area 102 such that the drivers have enough time to select an alternate route. Vehicles such as vehicles 116, 118 and 120 that are in host selection region 172 are far enough away from SLoC 152 to be considered candidates for the next ad hoc host. Vehicles such as vehicles 122 that are within buffer distance 170 of SLoC 152 are considered to be too close to SLoC to become the next ad hoc host.

The vehicles are divided into DSRC-equipped vehicles shown as solid ovals and non-DSRC-equipped vehicles shown as empty ovals. Each DSRC-equipped vehicle is capable of receiving a safety message from another DSRC-equipped vehicle, providing a user interface that conveys information to a person in the DSRC-equipped vehicle based on the safety message, and rebroadcasting the safety message to other DSRC equipped vehicles. In general, the rebroadcasting of safety messages causes the messages to move backwards through traffic as indicated by the arrows between vehicles in FIG. 1. In addition, DSRC-equipped programmable changeable message signs (PCMSs), such as sign 150, are positioned in alert region 174 and are capable of receiving safety messages and conveying warning messages to non-DSRC equipped vehicles based on the received safety messages. For known congestion areas, such as those associated with work zones, DSRC equipped PCMSs are strategically placed well before the expected congestion area to display the traffic parameters for the benefit of those vehicles that lack DSRC capability. This permits drivers to choose an alternate route even if their vehicle is not equipped with DSRC.

In the various embodiments, the safety messages originate from a DSRC-equipped vehicle that acts as an ad hoc host, such as previous ad hoc host 138. In most embodiments, there is only one ad hoc host at a time. In other embodiments, there are multiple ad hoc hosts with one ad hoc host acting as a master and the remaining ad hoc hosts acting as slaves. As described more fully below, a DSRC-equipped vehicle agrees to be an ad hoc host, such as new ad hoc host vehicle 120, while it is in a host selection region 172 of pre-congestion area 104. As soon as it becomes the ad hoc host, vehicle 120 periodically rebroadcasts the latest traffic parameters provided by previous ad hoc host vehicle 138, which has reached post-congestion area 103. In addition, new ad hoc host vehicle 120 begins collecting new traffic parameters as it moves into and through congestion area 102. Once it has collected the new traffic parameters it sends safety messages containing those new parameters. When the ad hoc host reaches post-congestion area 103, it relinquishes its position as ad hoc host and transmits the latest traffic parameters, which are then transmitted back through traffic to the next ad hoc host.

In one embodiment, there are multiple ad hoc hosts present in the congestion especially through large congestion areas with long travel times. A single ad hoc host will not update the travel time until it exits the congestion and calculates the updated travel time. When the travel time is longer, multiple ad hoc hosts will be needed for more frequent updating of the travel time so that drivers can get a more realistic picture of current travel time. When multiple ad hoc hosts are present, one of the ad hoc hosts will be a master ad hoc host and the others will be slave ad hoc hosts. The selection criteria for becoming an ad hoc host will remain the same for both master and slave ad hoc hosts. The master ad hoc host will acquire and disseminate travel parameters and slave hosts will only acquire the travel parameters while travelling through the congestion. Once the master ad hoc host leaves the congestion, one of the slave ad hoc hosts (the most ahead in the queue or having the least geographical distance from the master ad hoc host) will become the new master ad hoc host and a new ad hoc host will be selected from the vehicles in host selection region 172.

Figure 2:
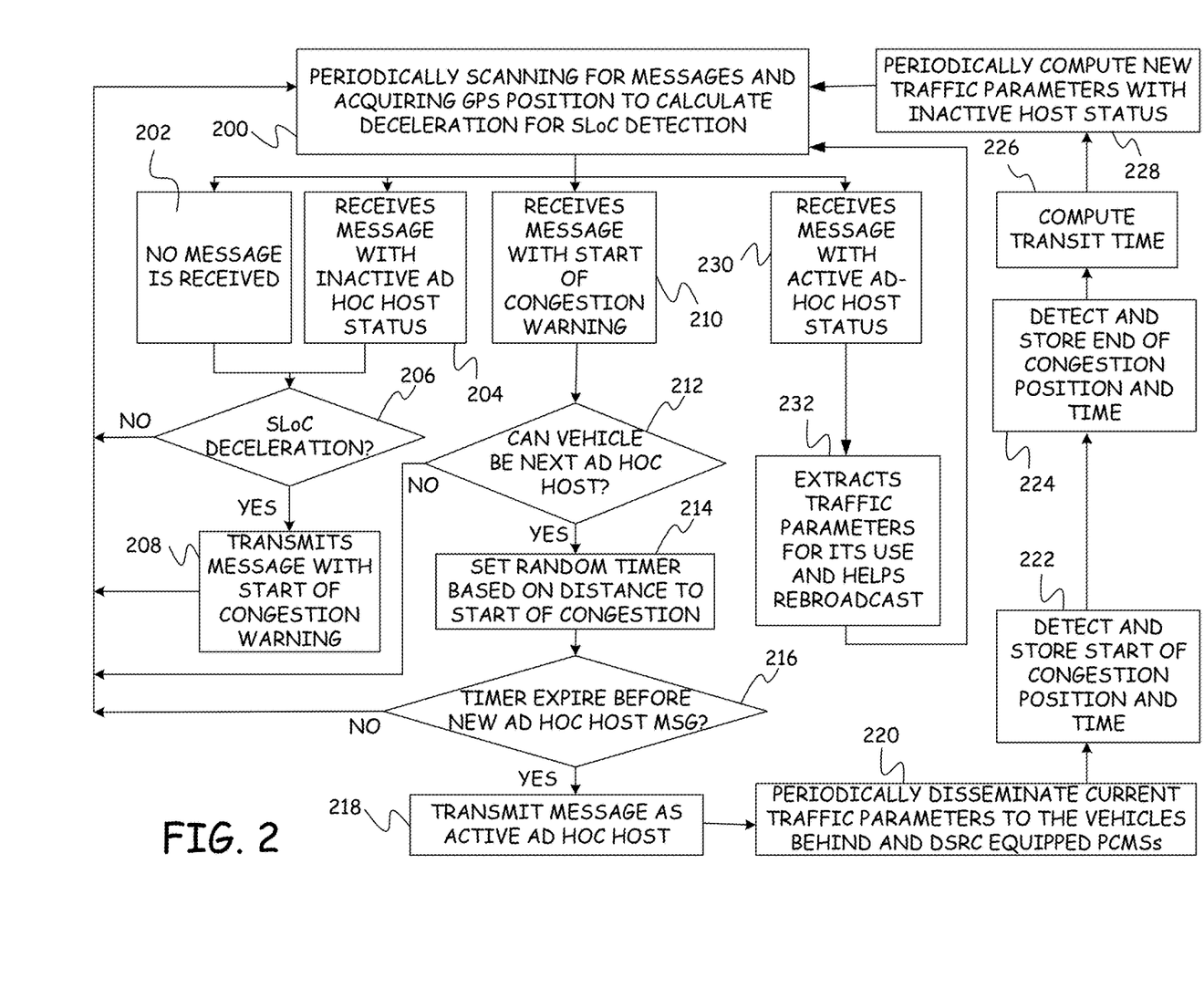
FIG. 2 provides a flow diagram of a process of selecting and using an ad hoc host that determines traffic parameters and issues messages containing traffic parameters.

FIG. 2 provides a flow diagram of steps performed by a DSRC vehicle as it passes through pre-congestion area 104, congestion area 102 and finally post-congestion area 103.

Figure 6:
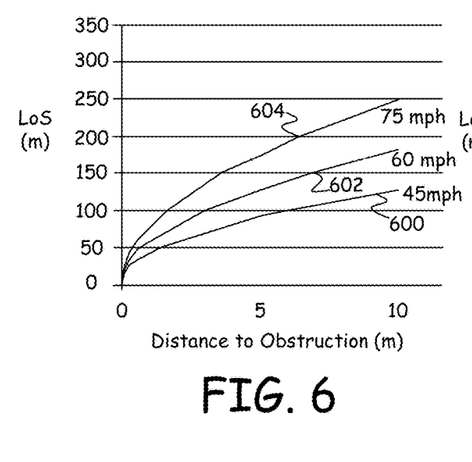
FIG. 6 is a graph of line of sight as a function of distance to obstruction for three vehicle speeds.

At step 200, all DSRC-equipped vehicles that are in pre-congestion area 104 or congestion area 102 and are not acting as the ad hoc host, such as vehicles 112, 114, 116, 118, 120, 122, 124, 125, 128, 130, 132, 134 and 136, periodically scan for safety messages and acquire Global Positioning Satellite (GPS) position information to calculate the velocity and acceleration/deceleration of the vehicle. Each vehicle that is equipped with DSRC is also assumed to be equipped with a GPS receiver to acquire the location of the vehicle, and calculate the speed, acceleration, and heading of the vehicle on the road at any given time. Using the DSRC technology, all DSRC-equipped vehicles will exchange short safety messages with each other using V2V communication to estimate traffic parameters. A block diagram of DSRC-equipped vehicles is discussed below in connection with FIG. 6.

In accordance with some embodiments, the short safety message format is assumed to be the Traveler Information Message (TIM) or the Basic Safety Message (BSM) format to comply with the standard J2735 as laid out by the Society of Automotive Safety Engineers (SAE) (27). Please note that during the whole traffic data acquisition and dissemination cycle, all the data is kept anonymous among the communicating vehicles using randomly assigned identifications to every message in some embodiments.

If at step 202, no message is received because there is no current ad hoc host, or if at step 204, a message is received that indicates that the current ad hoc host has changed its status to inactive, the vehicle proceeds to step 206 where the vehicle determines if it is decelerating enough to indicate that the vehicle is entering congested area 102 from pre-congested area 104. In other words, step 206 is performed when there is no current ad hoc host or when the current ad hoc host indicates it is about to relinquish its duties as ad hoc host by changing its status to inactive. When either of these events occurs, a new ad hoc host must be selected. Before a new ad hoc host can be selected, SLoC detection region 402 must be identified to ensure that the new host has not reached SLoC detection region 402 yet.

SLoC detection region 402 is identified by identifying where vehicles are when they experience a sudden deceleration. The vehicles in free-flow area 400 of pre-congestion area 104, such as vehicles 118, 120, 112 and 110, travel at a free-flow speed. Within SLoC detection region 402, drivers of vehicles such as vehicles 124 and 125 see the start of congestion and each driver applies the brakes to avoid a rear-end collision. Different drivers apply brakes differently resulting in various deceleration profiles. These deceleration profiles can be divided into three main categories; standard deceleration, cautious deceleration, and extreme deceleration. Standard deceleration is a generally constant deceleration. Cautious deceleration is initially more rapid than standard deceleration and then transitions into a constant speed. Cautious deceleration slows the vehicle well before the actual start of congestion. Extreme deceleration is more rapid than cautious deceleration and occurs extremely close to the actual start of congestion.

Around 90% of the vehicles comfortably acquire a standard deceleration rate of 3.4 m/s² to bring the vehicle to complete stop on a dry road. The standard deceleration rate value is taken as 3.4 m/s² in the literature, while the values of cautious and extreme deceleration rates are generally considered around 6 m/s² and 8.5 m/s², respectively.

Figure 3:
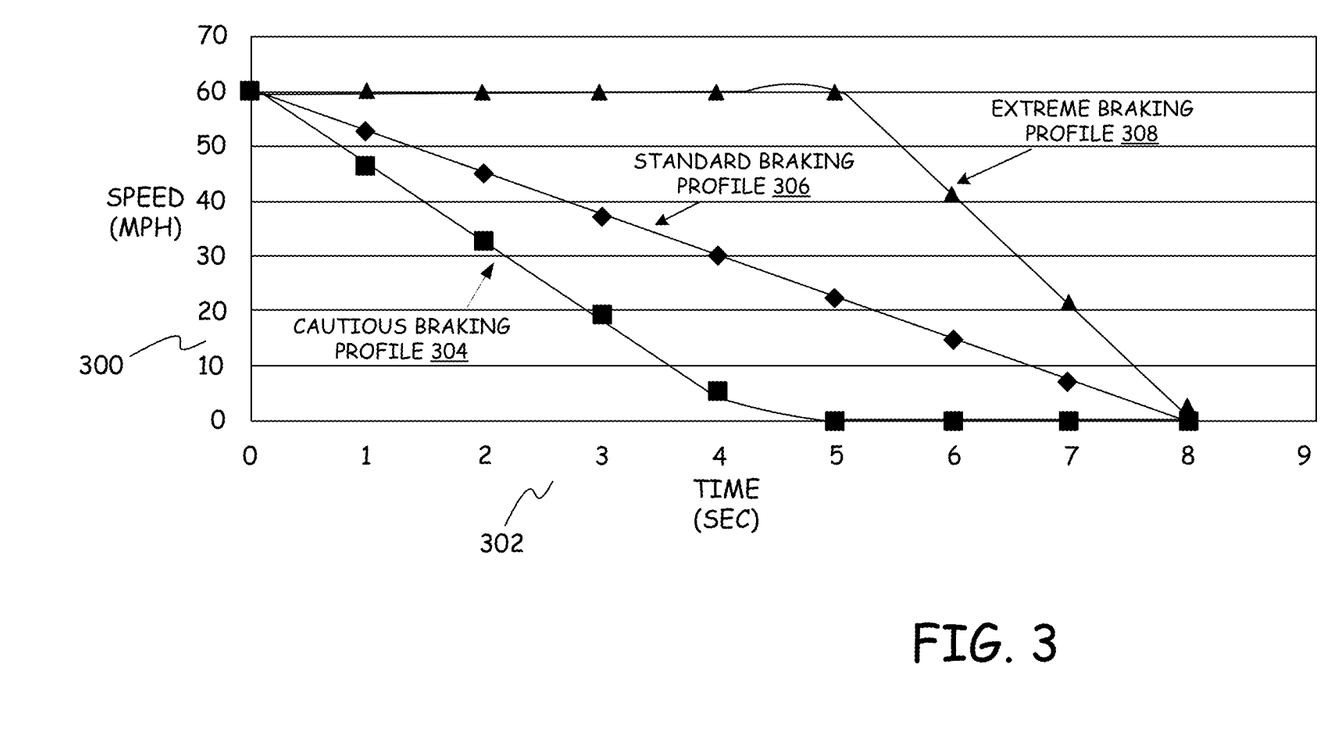
FIG. 3 is a graph showing braking profiles.

FIG. 3 shows examples of the three deceleration profiles: a cautious braking profile 304, a standard braking profile 306, and an extreme braking profile 308. In FIG. 3, speed is shown along vertical axis 300 and time is shown along horizontal axis 302. The three example profiles all begin with a free-flow speed of 60 miles per hour and an ending speed of 0 miles per hour. If multiple vehicles travelling at free flow speed experience a deceleration rate equal to or greater than the standard deceleration rate for a selected time duration, then it is highly likely that the vehicles are approaching the start of congestion.

In step 206, a vehicle determines if the deceleration and or past deceleration and current speed of the vehicle indicates that a SLoC is approaching. In accordance with one embodiment, three different criteria are used in step 206. These criteria are depicted in FIG. 4, which shows a range of deceleration values and corresponding speed values for determining if a SLoC is approaching.

Figure 4:
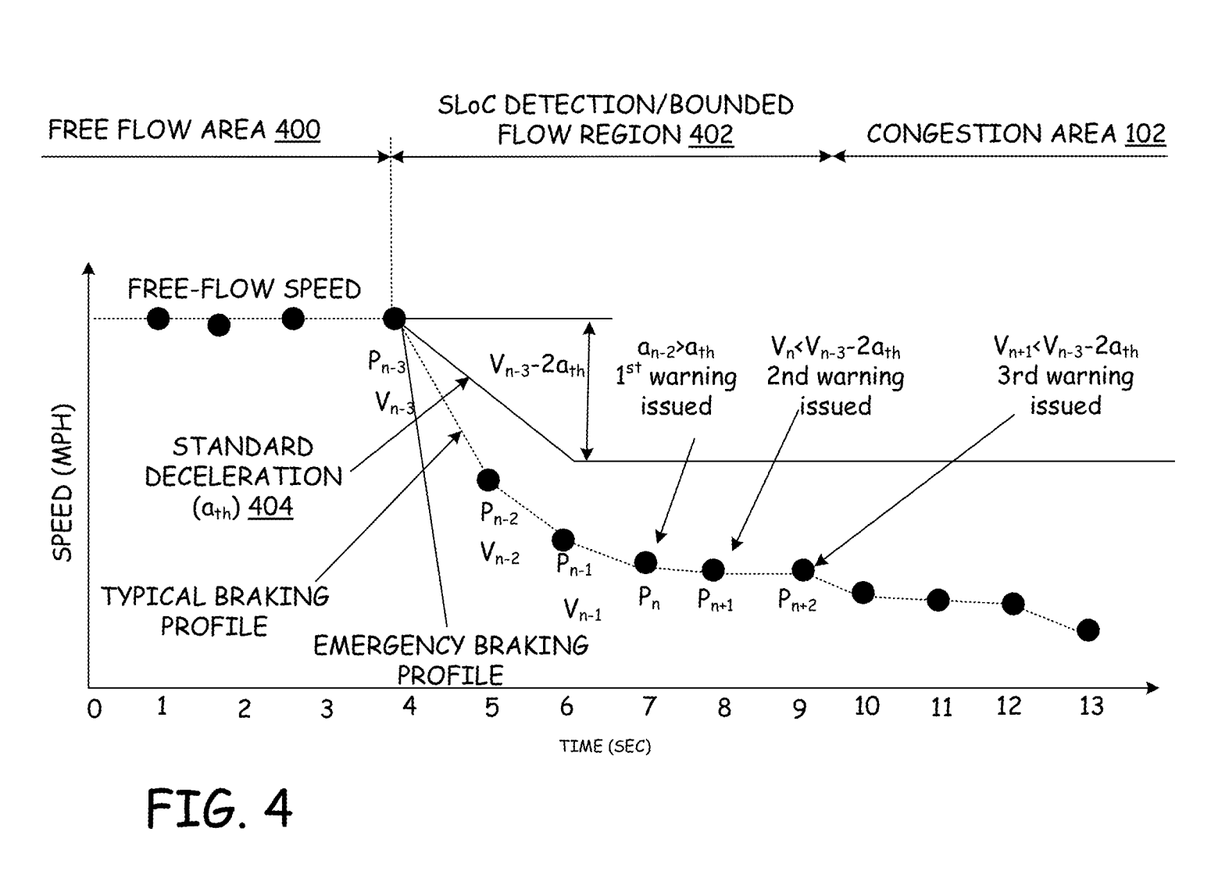
FIG. 4 is graph showing a speed profile of a vehicle as it approaches congestion.

The standard deceleration rate 404 is shown as $a_{th}$ in FIG. 4 and has an exemplary value of 3.4 m/s² in some embodiments. Any vehicle entering the congestion must experience a deceleration value of at least $a_{th}$ or higher for a certain time duration in order to generate a warning message. Please note that normally, the upper bound of deceleration value will not exceed the emergency deceleration profile unless a rear-end collision occurs.

Using GPS receiver, each DSRC equipped vehicle is continuously acquiring its position every second, and stores the vehicle's four latest positions ($P_n$, $P_{n-1}$, $P_{n-2}$ and $P_{n-3}$) at any given time, n, to calculate the vehicle's three latest speeds ($V_{n-1}$, $V_{n-2}$ and $V_{n-3}$) and the most current deceleration value ($a_{n-2}$) as shown in FIG. 4 for a typical braking profile. If the calculated deceleration $a_{n-2}$ at any given time n, is more than $a_{th}$, the vehicle will issue the vehicle's first warning message, also referred to as a safety message, at step 208.

After issuing the first warning message, the vehicle will return to step 200 and scan for additional messages and acquire new GPS information for a next time interval (n+1) and recalculates new values of speed $V_n$ and deceleration $a_{n-1}$. If step 202 or step 204 are followed from step 200, the vehicle continues at step 206 where it determines if the deceleration value $a_{n-1}$ or the average deceleration over two consecutive time intervals is more than the standard deceleration $a_{th}$. The later condition is equivalent to the vehicle's speed staying below $V_{n-3}-2a_{th}$, where $V_{n-3}$ is the free flow speed. If at step 206, the vehicle's current deceleration or average deceleration is greater than the standard deceleration $a_{th}$, the vehicle issues a second start of congestion warning message (second safety message) at step 208.

The vehicle then returns to step 200 and scans for additional messages and acquires new GPS information for a next time interval (n+1) and recalculates new values of speed $V_n$ and deceleration $a_{n-1}$. If step 202 or step 204 are followed from step 200, the vehicle continues at step 206 where it determines if the vehicle's speed is still below $V_{n-3}-2a_{th}$, where $V_{n-3}$ is the free flow speed. If at step 206, the vehicle's speed is still below $V_{n-3}-2a_{th}$, the vehicle issues a third start of congestion warning message (third safety message) at step 208.

In accordance with one embodiment, each of the three warning messages issued in step 208 is transmitted three times within 100 msec to increase the probability of the warning message being received by the vehicles behind the transmitting vehicle in case of a temporary LoS (Line of Sight) blockage by a moving vehicle in the middle. Examples of such messages are shown in FIG. 1 by the solid single-head arrows. These messages are received by the trailing DSRC-equipped vehicles in the free-flow area and in particular are received by vehicles 116, 118 and 120 in host selection region 172. Each warning message includes the transmitting vehicle's current position and heading and the free-flow speed before experiencing the deceleration. To calculate the vehicle's heading, the vehicle keeps a record of the vehicle's position every 50 meters and at the time of issuing a warning message, the vehicle calculates its heading over the most recently travelled distance of at least 100 meters to facilitate ad hoc host selection on a curved road as discussed further below.

The warning messages transmitted at step 208 will be received by all surrounding vehicles but are intended only for the potential ad hoc hosts vehicles i.e., DSRC-equipped vehicles travelling behind the transmitting vehicle on the same road in host selection region 172.

Once a DSRC-equipped vehicle issues a warning at step 208 it is broadcast in all directions within its direct wireless access range. Theoretically, the direct wireless access range is 500 m, but practically, it turns out to be around 250 m with clear LoS. The clear LoS will be affected by many factors including some moving obstacles in between the warning BSM issuing vehicle and potential ad hoc host vehicles.

In addition to moving obstacles, some road geometry features could also affect the LoS and thereby limit the reception range in which a warning message can be received. Broadly speaking, there are two major road geometry features that directly affect the LoS: horizontal curves, and vertical curves i.e., road elevation.

Figure 5:
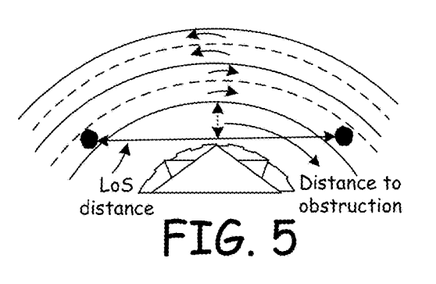
FIG. 5 is a plan view showing line of sight on curved road.

Along a horizontal curves, the LoS between two vehicles is limited whenever an obstacle is present alongside the road, e.g., some natural growth or a concrete structure. On a freeway, the LoS distance is measured as the distance between two vehicles that are in the middle of the innermost lane, as shown in FIG. 5. The maximum LoS distance will increase as the distance of the obstruction from the road increases, as shown in FIG. 5. The LoS distance as a function of distance to the obstruction for design speeds of 45, 60, and 75 MPH is shown in graphs 600, 602 and 604 of FIG. 6. Note that the design speed determines the degree of curvature of any roadway. The higher the design speed is, the lesser is the degree of curvature and thereby the estimated LoS distance is greater. Generally, the recommended minimum horizontal curve obstruction distance is 6 meters which gives a LoS distance of around 150 meters at the design speed of 60 MPH (graph 604 of FIG. 6). Therefore, on a curved road with design speed of 60 MPH, the range of DSRC based V2V communication is limited to around 150 meters.

Figure 7:
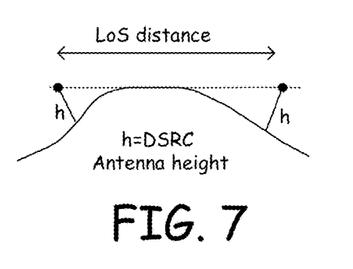
FIG. 7 is a sectional view of a roadway showing line of sight on a hill.
Figure 8:
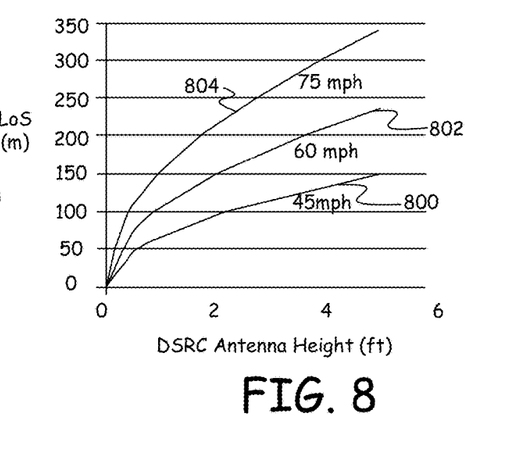
FIG. 8 is a graph of line of sight as a function of antenna height for three vehicle speeds.

A vertical curve is a parabolic curve that is designed to make a transition between two grades on a given road. A vertical curve could be a sag or a crest. While the sag curve does not limit LoS, the crest vertical curve does. The road surface itself is an obstruction to the LoS between two vehicles on a crest curve as shown in FIG. 7, and the LoS distance depends upon the DSRC antenna height (h). The LoS distance as a function of antenna height is shown in graphs 800, 802 and 804 if FIG. 8 for design speeds of 45, 60, and 75 MPH, respectively. Generally, the antenna height is comparable to the driver eye height which is taken as 3.5 ft for most vehicles. Using this antenna height, the LoS distance for the design speed of 60 MPH turns out to be around 200 m.

At step 210, a vehicle receives one of the start of congestion warning messages issued in step 208. When such a message is received, the receiving vehicle determines if it can be the next ad hoc host at step 212. A process for determining if a vehicle can be the next ad hoc host in accordance with one embodiment is shown in the flow diagram of FIG. 9.

Figure 9:
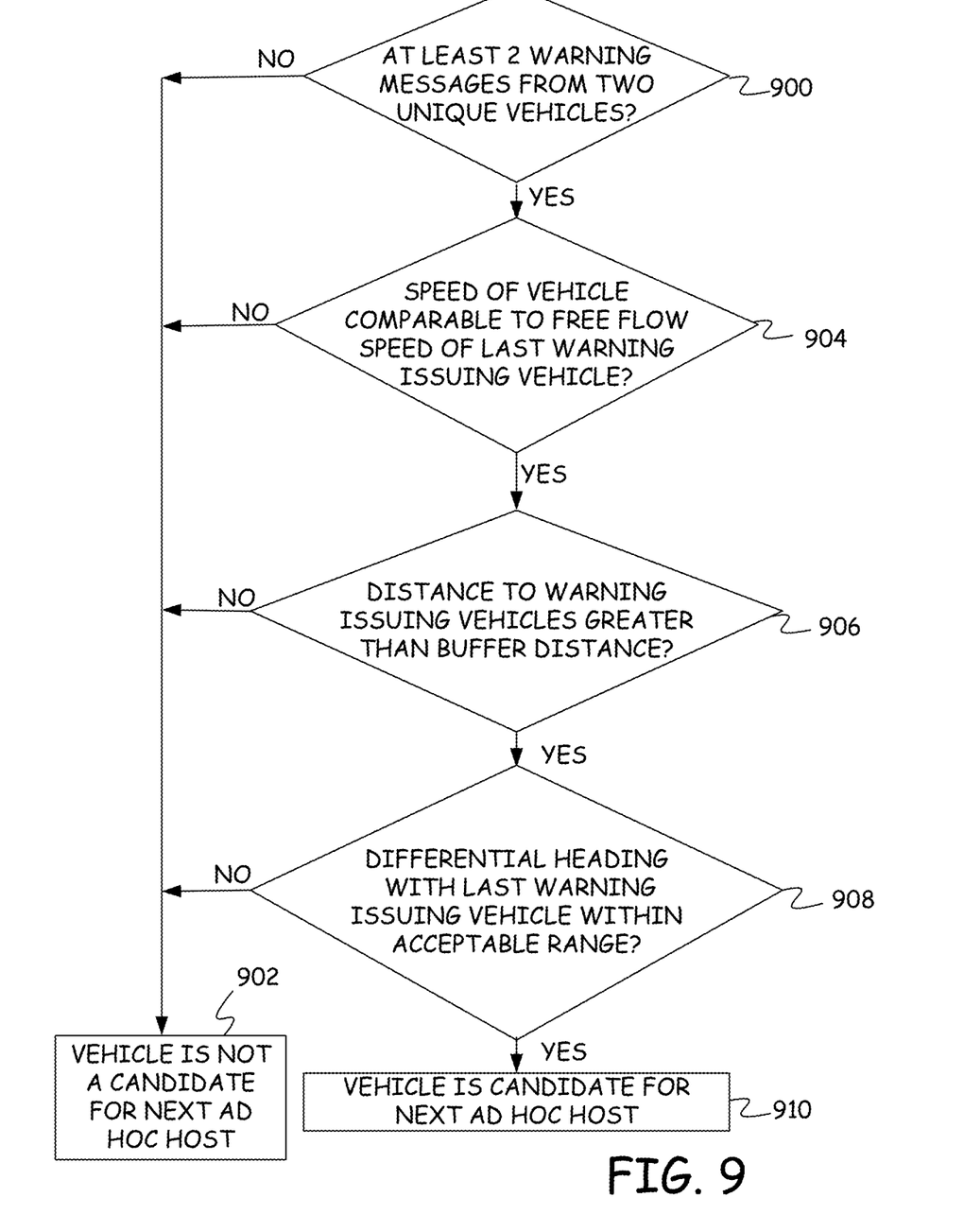
FIG. 9 is a flow diagram for identifying whether a vehicle is a candidate to be the next ad hoc host.

In step 900, the receiving vehicle determines if it has received at least two unique warning messages from two unique vehicles. The two unique warning messages are warning messages that were issued when the issuing vehicle was at two different positions and are not simply repetitions of the same message. The condition of receiving two messages from two unique vehicles is beneficial because it can eliminate a mistaken start of congestion warning due to random braking by an individual driver that is not in response to approaching congestion. If a vehicle has not received two warning messages from two unique vehicles, the receiving vehicle is not a candidate for the next ad hoc host, as indicated by step 902.

If the receiving vehicle has received two warning messages from two unique vehicles, the receiving vehicle then performs a speed test at step 904. Each warning message carries the highest of the three stored speeds of the issuing vehicle prior to issuing the warning message. At step 904, the recipient vehicle compares its current speed to the speed in the latest warning message. The speed of potential ad hoc host vehicles should be comparable to the speed value in the warning message within one standard deviation of average speed variability. Vehicles, such as vehicle 130, that are ahead of the warning issuing vehicle on the same road will not have comparable speed because they have already entered in the congestion. Thus, this test will eliminate vehicles that have already entered the congestion as possible new ad hoc hosts. Similarly, this test will eliminate vehicles on any parallel service road because it is assumed that the speed on such service roads will be different from the speed on the road containing the congestion.

If the receiving vehicle does not have a comparable speed to the highest speed of the warning vehicles, the receiving vehicle is not a candidate to be the next ad hoc host at step 902. If the speed of the receiving vehicle is acceptable at step 904, the receiving vehicle then determines if it is at a proper location to act as the ad hoc host at step 906.

Each warning message carries the location of the issuing vehicle when the warning message was issued. In step 906, the receiving vehicle calculates the distance between the receiving vehicle and the issuing vehicle. A potential ad hoc host should be behind the issuing vehicle by more than predetermined buffer distance 170 of FIG. 1. This allows the potential ad hoc host to estimate SLoC by itself experiencing the change of speed from free flow to congested flow. In accordance with one embodiment, the buffer distance is 50 meters, which is within reach of direct wireless access even on a curved or an elevated road. That means that a potential host could be present anywhere between 50 and 500 meters (the practical DSRC wireless range) from the warning issuing vehicle.

If the receiving vehicle is not further than the buffer distance from the issuing vehicle at step 906, the receiving vehicle is not a candidate to become the next ad hoc host, as shown by step 902. If the receiving vehicle is further than the buffer distance from the issuing vehicle, the receiving vehicle then performs a heading test at step 908.

Figure 10:
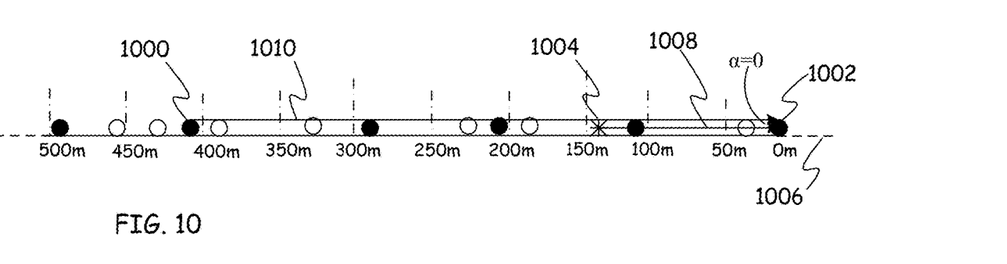
FIG. 10 is a plan view of a straight roadway showing a heading differential.
Figure 11:
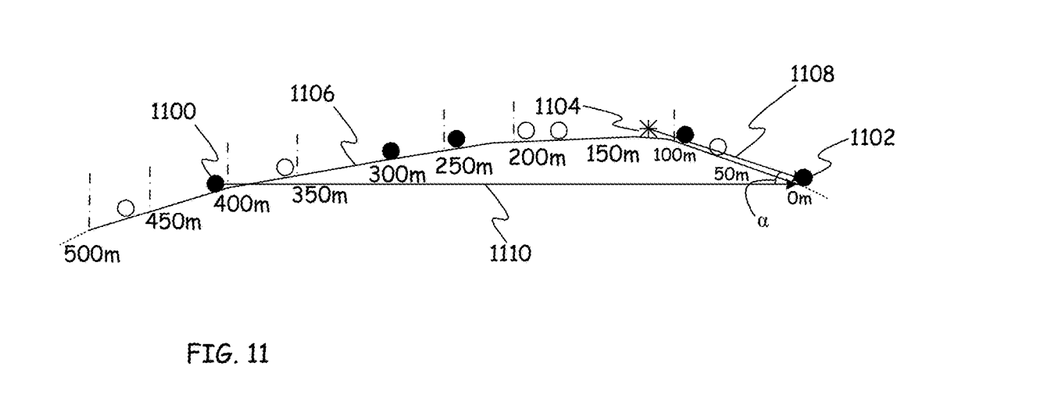
FIG. 11 is a plan view of a curved roadway showing a heading differential.

Each warning message carries the heading of the issuing vehicle calculated over its last travelled distance of 100 meters-150 meters. During the heading test of step 208, the receiving vehicle calculates a vector from the receiving vehicle's current location to the issuing vehicle's location when it issued the warning message. FIG. 10 shows an example of this determination for a straight road 1006. In FIG. 10, issuing vehicle 1002 is shown to be at position 0 and receiving vehicle 1000 is shown to be 400 meters behind the issuing vehicle. In addition, issuing vehicle 1002 has determined its average heading when it was moving from a position 1004 to position 0. That average heading is designated by arrow 1008. The vector from the receiving vehicle to the issuing vehicle at position 0 is shown as arrow 1010. As shown in FIG. 10, the angle between heading arrow 1008 and vector arrow 1010 is zero. FIG. 11 shows another example of this determination for a curved road 1106. In FIG. 11, issuing vehicle 1102 is shown to be at position 0 and receiving vehicle 1100 is shown to be 400 meters behind the issuing vehicle. In addition, issuing vehicle 1102 has determined its average heading when it was moving from a position 1104 to position 0. That average heading is designated by arrow 1108. The vector from the receiving vehicle to the issuing vehicle at position 0 is shown as arrow 1110. As shown in FIG. 11, there is an angle, $\alpha$, between heading arrow 1108 and vector arrow 1110.

As noted above, on a curved road, obstructions in the interior of the curve interfere with the vehicle to vehicle communication. This reduces the maximum Line of Sight distance between potential ad hoc hosts and a warning issuing vehicle to $100m$ as shown in FIG. 11. This will give a maximum differential heading of about $\pm 14.1°$ because the standard road curvature design guidelines suggest that a freeway designed for the speed of 60 MPH, can curve $0.141°$ per meter at the most. Therefore, in step 908 the differential heading angle, $\alpha$, between the heading of the issuing vehicle and the vector from the receiving vehicle to the issuing vehicle must be less than $\pm 15°$ in order for the receiving vehicle to be considered a candidate ad hoc host in some embodiments. This differential heading limit ensures elimination of vehicles on opposite lanes as well as on any crossing roads.

Any recipient vehicle which passes all of the tests of steps 900, 904. 906, and 908 will be considered a candidate for the next ad hoc host at step 910. If a vehicle fails even one of the tests of steps 900, 904, 906, and 908, the vehicle will not be a candidate to become the next ad hoc host.

If a receiving vehicle determines that it is not a candidate to be the next ad hoc host at step 212/902, the receiving vehicle will return to step 200. If the receiving vehicle determines that it is a candidate to be the next ad hoc host at step 212/910, it sets a timer at step 214. The timer set at step 214 is used to select one candidate ad hoc host from a collection of receiving vehicles that have all determined that they qualify to be the next ad hoc host. The timers set in the receiving vehicles are designed to give preference to the potential host which is furthest from the two warning issuing vehicles to ensure that the potential host is still in the free flow region. This is accomplished via a random wait time protocol in which each potential ad hoc host will wait for a random period of time chosen from a time window that depends on the average distance from the two warning issuing vehicles. In one embodiment, each time window spans a 10 millisecond interval. For example, distances of 400-500 meters are assigned a range of wait times from 0-10 ms, distances of 300-400 meters are assigned a range of wait times from 10-20 ms, distances of 200-300 meters are assigned a range of times from 30-40 ms, distances of 100-200 meters are assigned a range of times from 40-50 ms and distances from 50-100 meters are assigned a range of times from 50-60 ms. Thus, a receiving vehicle that is further from the two warning issuing vehicles will have its timer set for a shorter time than a receiving vehicle that is closer to the two warning issuing vehicles.

At step 216, each receiving vehicle determines if its timer expired before receiving a message indicating that a new ad hoc host had been selected. If the message indicating that a new ad hoc host has been selected is received before the receiving vehicle's timer expires, the receiving vehicle returns to step 200 and no longer considers itself a candidate to be the next ad hoc host. If the receiving vehicle's timer expires before a new ad hoc host is selected, the receiving vehicle issues a message at step 218 proclaiming itself as the next ad hoc host and placing itself in an active ad hoc host status.

Once a vehicle selects itself as the new ad hoc host at step 218, it sets a task to periodically disseminate current traffic parameters to vehicles that are behind it and to DSRC equipped PCMSs at step 220. In this context, the current traffic parameters are the traffic parameters, such as SLoC, the ELoC and the Transit Time (TT), determined by the previous ad hoc host such as ad hoc host 138. The new ad hoc host will periodically broadcast these traffic parameters to the vehicles behind congestion area 102, using V2V communication, until the new ad hoc host determines that it has reached the end of the congestion. The new ad hoc host originates a message every second carrying these traffic parameters, as well as the indication that an active ad hoc host exists, in its data fields. These messages are propagated in the intended direction on the road using a V2V communication protocol and are received by other vehicles as indicated by step 230. The maximum propagation distance can be set by the ad hoc host which could be about 5-10 times the length of the congestion. Any DSRC vehicle on the same road behind the congestion will not only extract the traffic parameters from the message for its own use but will also help relay the message as indicated by step 232. Please note that DSRC-equipped PCMSs present alongside the road will also receive these messages, and will display the useful traffic parameters for those vehicles which lack DSRC capability.

In some embodiments, in addition to the travel time and start and end of congestion locations, the information messages will contain other parameters such as the name of the congested road and direction of congested travel. The name of the road is determined by the host vehicle using geographical information system data (containing the names of US roadways) in the car processor. The road name data can be used along with the start and end of the congestion locations in a similar manner as is done in ordinary navigational devices.

In addition to the dissemination of traffic parameters, the ad hoc host estimates a new set of traffic parameters. At step 222, the new ad hoc host uses its GPS receiver to acquire its position every second and uses those position values to calculate its deceleration. By comparing the newly calculated deceleration every second with $a_{th}$, the new ad hoc host will estimate a new value for the start of congestion (SLoC). In addition, the new ad hoc host will store when it reached the start of congestion so that it can calculate the transit time for passing through the congestion.

As the ad hoc host moves through the congestion, it continues to acquire its position every second, calculate its speed, and compare that speed with its own free flow speed prior to entering the congestion. When the speed of the ad hoc host becomes comparable to its free flow speed prior to entering the congestion for 10 consecutive seconds, the ad hoc host will identify the location where its speed returned to the free flow speed as the end of congestion (ELoC) at step 224. The ad hoc host will also record the time when it reached the end of congestion. At step 226, the ad hoc host will compute the transit time from the recorded time when it was at SLoC to the time when it reached ELoC.

Once, the new set of traffic parameters i.e., SLoC, ELoC, and TT are estimated, the ad hoc host will update the corresponding fields of the information message with these new parameters and will change the status of the ad hoc host to inactive at step 228 to trigger the selection of a new ad hoc host. In accordance with some embodiments, the now "inactive" ad hoc host will continue to issue the messages of step 228 with updated traffic parameters and ad hoc host status change, for another 5 seconds before abandoning its role as an ad hoc host. During these 5 seconds, the DSRC vehicles which are about to enter the SLoC, will receive the messages issued in step 228 and will perform steps 204, 206, 208, 210, 212, 214, 216 and 218 until a new ad hoc host has been selected.

The process described in FIG. 2 will continue until congestion ends or for some reason, an ad hoc host cannot complete the process of updating the traffic parameters. For example, if an ad hoc host decides to pull over and waits for congestion to clear, or decides to take a U turn, or takes an exit from the freeway in the middle of the congestion. Similarly, if for some reason, DSRC equipment of an ad hoc host fails and stops transmitting messages, the system operation will reset after a predetermined time and a new ad hoc host selection routine will be initiated.

Figure 12:
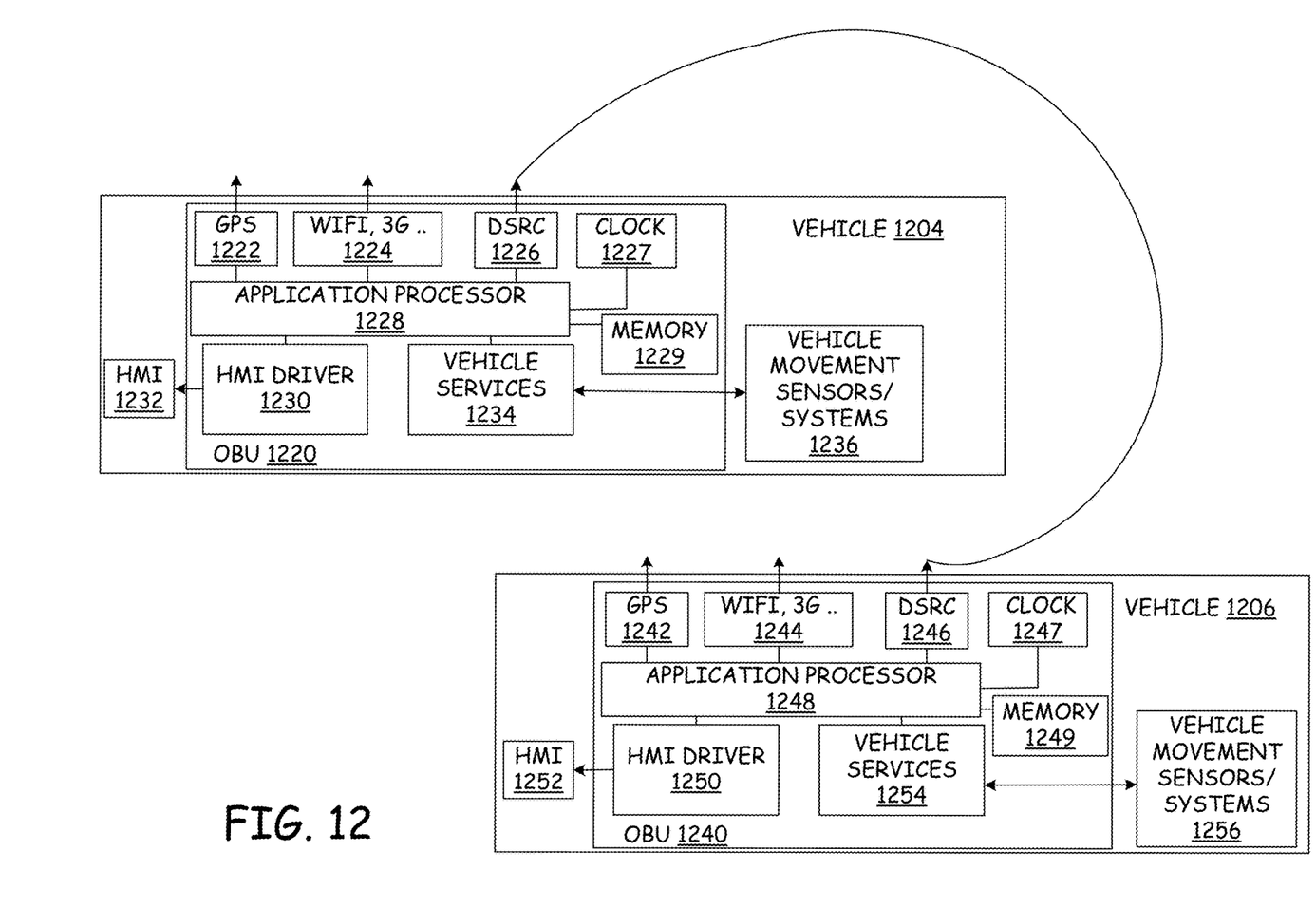
FIG. 12 is a block diagram of two exemplary vehicles that are used in the various embodiments.

FIG. 12 provides a block diagram of two vehicles 1204 and 1206 that can each act as an ad hoc host or as a vehicle issuing a warning message.

Vehicle 1204 includes an onboard unit 1220, also referred to as a vehicle-to-vehicle communication unit, a vehicle movement sensors/system 1236 and a human-machine interface 1232. Vehicle movement sensors/system 1236 provides information about the vehicle such as the current speed of the vehicle, the status of various vehicle components such as tires, lights, brakes and wipers, for example, and the orientation of the tires. This information is provided to a vehicle services module 1234 in onboard unit 1220, which provides the information to application processor 1228. Application processor 1228 is able to communicate wirelessly using a wireless modem 1224 to receive updates and to convey history information about vehicle 1204. Application processor 1228 also receives position information from a position system 1222, which in FIG. 12 takes the form of a global positioning system that determines the position of onboard unit 1220 based on signals provided by satellites.

Application processor 1228 is also able to transmit and receive messages using a vehicle-to-vehicle transceiver 1226, which in FIG. 12 takes the form of a DSRC transceiver. Using transceiver 1226, onboard unit 1220 is able to receive messages and processor 1228 decodes and interprets the messages to determine the traffic parameters transmitted by a previous ad hoc host and to determine that one or more vehicles ahead of vehicle 1204 are slowing down. Processor 1228 provides some or all of this information to a human-machine driver 1230, which generates human-machine interface 1232 to convey some or all of this information to a person in the vehicle. In addition, processor 1228 is able to construct additional information based on the traffic information provided by transceiver 1226. For example, when transceiver 1226 receives the position of the start of congestion or the position of the end of congestion, processor 1228 is able to calculate the distance from the vehicle's current location as determined from position system 1222 to both the start of congestion and the end of congestion. This additional information may also be provided to human-machine driver 1230 so that it can be conveyed to the user through human-machine interface 1232.

When vehicle 1204 is an ad hoc host, processor 1228 is able to identify a position for a start of congestion by first monitoring the speed of vehicle 1204. The speed is determined by a speed system, which in some embodiments is a speedometer as provided by vehicle movement sensors/systems 1236 and in other embodiments is processor 1228, which calculates the speed using multiple position measurements provided by position system 1222 and timing signals provided by clock 627. When the change in speed indicates that the vehicle is at the start of congestion, processor 1228 determines the current position of vehicle 1204 using positioning system 1222 and stores the position of the start of congestion in a memory 1229. In addition to storing the position of the start of congestion, processor 1228 also stores the current time as provided by a clock 1227 to create a record of when vehicle 1204 was at the start of congestion. As vehicle 1204 moves through the congestion, processor 1228 periodically checks vehicle 1204's speed as provided by vehicle movement sensors/system 1236 and/or positioning system 1222. When the speed indicates that vehicle 1204 has reached the end of the congestion, processor 1228 determines the vehicle's current position using positioning system 1222 and stores the position and a current time in memory 1229. Processor 1228 then determines a travel time through the congestion by taking the difference of the time when the end of congestion was reached and the time when the start of congestion was reached. Processor 1228 then stores this travel time in memory 1229.

Processor 1228 retrieves the position of the start of congestion, the position of the end of congestion and the travel time from memory 1229 and constructs a message containing that information that is then transmitted by transceiver 1226 together with an indication that the ad hoc host is inactive.

Memory 1229 can also be used to hold the traffic parameters provided by a previous ad hoc host. In particular, memory 1229 can hold the start of congestion, the end of congestion and the travel time determined by the previous ad hoc host. Processor 1228 will periodically construct a message containing this information and transmit the message using transceiver 1226 while vehicle 1204 is moving through the congestion area as the ad hoc host.

The messages provided by transceiver 1226 are received by a transceiver 1246 in an onboard unit 1240 of vehicle 1206. Vehicle 1206 has similar components to vehicle 1204 including vehicle movement sensors/systems 1256, human-machine interface 1252 and onboard unit 1240. Onboard unit 1240 includes a positioning system 1242, a wireless modem 1244, transceiver 1246, clock 1247, memory 1249, processor 1248, human-machine interface driver 1250 and vehicle services module 1254, which operate in a similar manner to the components of vehicle 1204 discussed above.

Although the present invention has been described with reference to preferred embodiments, workers skilled in the art will recognize that changes may be made in form and detail without departing from the spirit and scope of the invention.

What is claimed is:

1. A vehicle-to-vehicle communication unit comprising:
a vehicle communication transceiver that transmits messages from a first vehicle that the vehicle communication transceiver is installed in to other vehicles and that receives, while the first vehicle is moving on a roadway, at least one safety message from a second vehicle positioned ahead of the first vehicle on the roadway that indicates that the second vehicle has decreased its velocity;
a processor that, based on the safety message, generates a message for the other vehicles indicating that the vehicle-to-vehicle communication unit has designated itself as an ad hoc host for determining information about a congestion area on a roadway and provides the generated message to the vehicle communication transceiver, which transmits the generated message to the other vehicles.

2. The vehicle-to-vehicle communication unit of claim 1 wherein the vehicle communication transceiver further receives a message indicating that a vehicle-to-vehicle communication unit previously acting as an ad hoc host has abandoned its role as ad hoc host.

3. The vehicle-to-vehicle communication unit of claim 1 wherein before designating itself as an ad hoc host, the processor determines that the vehicle-to-vehicle unit is at least a set distance from the second vehicle.

4. The vehicle-to-vehicle communication unit of claim 3 wherein before designating itself as an ad hoc host, the processor determines that the first vehicle that the vehicle-to-vehicle communication unit is installed in is travelling at least as fast as the second vehicle before the second vehicle decreased its velocity.

5. The vehicle-to-vehicle communication unit of claim 4 wherein before designating itself as an ad hoc host, the processor determines that the vehicle-to-vehicle unit is heading within a set angle of the heading of the second vehicle.

6. The vehicle-to-vehicle communication unit of claim 1 wherein after designating itself as ad hoc host, the processor periodically transmits messages indicating a position for a start of the congestion area as determined by a previous ad hoc host, a position for an end of the congestion area as determined by the previous ad hoc host and a travel time for passing through the congestion as determined by the previous ad hoc host.

7. The vehicle-to-vehicle communication unit of claim 6 wherein the periodically transmitted messages further comprise a name of a road that the congestion area is located on.

8. The vehicle-to-vehicle communication unit of claim 7 wherein the periodically transmitted messages further comprise a direction of travel.

9. The vehicle-to-vehicle communication unit of claim 6 wherein after designating itself as ad hoc host, the processor stores the position where the first vehicle carrying the vehicle-to-vehicle communication unit slows as a new position for the start of the congestion area.

10. The vehicle-to-vehicle communication unit of claim 9 wherein after storing the new position for the start of the congestion area, the processor stores a position where the first vehicle carrying the vehicle-to-vehicle communication unit speeds up as a new position for the end of the congestion area.

11. The vehicle-to-vehicle communication unit of claim 10 wherein after storing the new position of the end of the congestion area, the processor stores the time the first vehicle carrying the vehicle-to-vehicle communication unit required to travel from the new position of the start of the congestion area to the new position of the end of the congestion area as a new travel time for the congestion area.

12. The vehicle-to-vehicle communication unit of claim 11 wherein the processor generates a new congestion message providing the new position of the start of the congestion area, the new position of the end of the congestion area and the new travel time and wherein the vehicle communication transceiver broadcasts the new congestion message to at least one other vehicle.

13. The vehicle-to-vehicle communication unit of claim 12 wherein generating the new congestion message comprises setting a status for the ad hoc host in the new congestion message that indicates that the vehicle-to-vehicle communication unit is abandoning its role as an ad hoc host.

14. A vehicle comprising:
a position system determining positions of the vehicle;
a speed system determining speeds of the vehicle;
a processor determining a position of a start of congestion from speeds provided by the speed system and a position provided by the position system, and determining a position of an end of congestion from speeds provided by the speed system and a position provided by the position system; and
a communication system receiving the position of the start of congestion and the position of the end of congestion from the processor and communicating directly to at least one other vehicle to provide the position of the start of congestion and the position of the end of congestion.

15. The vehicle of claim 14 further comprising a clock and wherein the processor further determines a time to travel from the position of the start of congestion to the position of the end of congestion based on times from the clock.

16. The vehicle of claim 15 wherein the communication system communicates directly to at least one other vehicle to provide the time to travel from the position of the start of congestion to the position of the end of congestion.

17. The vehicle of claim 14 wherein before determining the position of the start of congestion the communication system communicates directly to at least one other vehicle to convey that the vehicle has designated itself as an adhoc host for determining the position of the start of congestion and the position of the end of congestion.

18. The vehicle of claim 17 wherein before conveying that the vehicle has designated itself as an adhoc host, the processor determines if the vehicle is positioned before the start of congestion.

19. The vehicle of claim 18 wherein the processor determines if the vehicle is positioned before the start of congestion based on a message sent to the vehicle from another vehicle that indicates that the other vehicle is decelerating and the position where the other vehicle is decelerating.

20. The vehicle of claim 19 wherein the processor determines if the vehicle is positioned before the start of congestion by determining if the vehicle is within a threshold distance of where the other vehicle decelerated.

21. The vehicle of claim 20 wherein the processor determines if the vehicle is positioned before the start of congestion by determining a heading for the vehicle and a heading for the other vehicle and determining if an angle between the two headings is less than a threshold angle.

22. The vehicle of claim 21 wherein the processor determines if the vehicle is positioned before the start of congestion by determining if the speed of the vehicle is substantially similar to the speed of the other vehicle before the other vehicle decelerated.

23. A system of vehicles comprising:
a decelerating vehicle entering a congestion area and issuing, by a communication unit, a vehicle-to-vehicle message indicating the position of the vehicle and that the vehicle is decelerating; and
a free-flow vehicle that has yet to reach the congestion area, receiving, by a second communication unit, the vehicle-to-vehicle message and based on the message evaluating whether the free-flow vehicle is a candidate for evaluating the congestion and when the free flow vehicle is a candidate for evaluating the congestion, the free flow vehicle issuing a vehicle-to-vehicle message indicating that the free-flow vehicle has designated itself to begin evaluating the congestion and thereby becoming a host vehicle.

24. The system of claim 23 wherein after issuing the vehicle-to-vehicle message indicating that the host vehicle has designated itself to begin evaluating the congestion, the host vehicle issues a message indicating a start position of the congestion area, an end position of the congestion area and a travel time for passing through the congestion area that were determined by another vehicle.

25. The system of claim 24 wherein the free-flow vehicle determines if it is a candidate for evaluating the congestion by comparing a speed of the free-flow vehicle to a speed of the decelerating vehicle before the decelerating vehicle decelerated.

26. The system of claim 24 wherein the free-flow vehicle further determines if it is a candidate for evaluating the congestion by determining if a difference between a heading for the decelerating vehicle and a heading of the free-flow vehicle is less than a threshold.

27. The system of claim 23 wherein the free-flow vehicle determines a new starting position of the congestion area, a new ending position of the congestion area, and a new travel time for travelling from the new starting position of the congestion area to the new ending position of the congestion area.

28. The system of claim 27 wherein the host vehicle issues a vehicle-to-vehicle message indicating the new starting position of the congestion area, the new ending position of the congestion area and the new travel time and indicating that the host vehicle will no longer evaluate the congestion.

29. The system of claim 27 further comprising multiple host vehicles at a same time, wherein each host vehicle issues a vehicle-to-vehicle message indicating that the host vehicle has designated itself to begin evaluating the congestion.

30. The system of claim 29 wherein one of the host vehicles is designated as a master host vehicle and the remaining host vehicles are designated as slave host vehicles such that the master host vehicle but not the slave host vehicles issues a message indicating a start position of the congestion area, an end position of the congestion area and a travel time for passing through the congestion area that were determined by another vehicle.

* * * * *